Patented Sept. 13, 1949

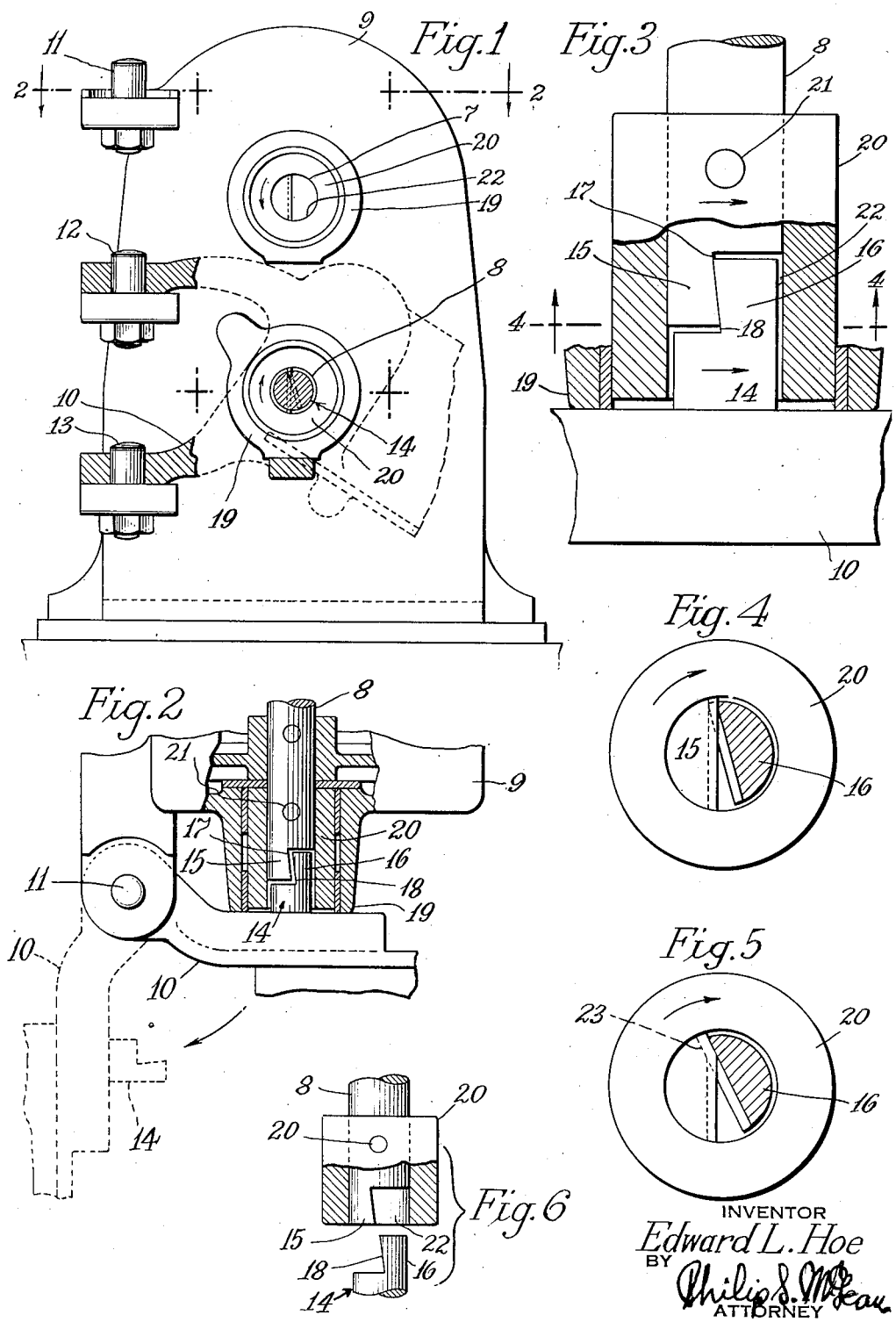

2,481,593

UNITED STATES PATENT OFFICE 2,481,593

AXIALLY ENGAGING POSITIVE CLUTCH

Edward L. Hoe, Poughkeepsie, N. Y.

Application April 24, 1946, Serial No. 664,516

2 Claims. (Cl. 192—67)

The invention disclosed herein relates to clutch constructions and particularly to those of the type in which the shafts to be coupled and uncoupled are engaged and disengaged by relative endwise movements of the shafts.

In this type of clutch some means are usually required to hold the shafts together in their clutched engagement. Such means may take the form of spring latches and the like.

In prior patents to Robert Hoe, 1,864,304 of June 21, 1932 and 1,983,292 of December 4, 1934, there are shown power units for operating various household appliances and involving in each instance companion driving and driven shafts having mating clutch elements and arranged with the driven shaft on a support mounted to swing toward and away from the base carrying the driving shaft. The different attachments require different kinds of interchangeable supports and special spring latches are required to hold these supports with the clutch elements on the ends of the shafts in engaged relation.

In using such machines special attention must be exercised to swing the support to the fully latched position and then before the shafts can be unclutched, the latch must be released to free the support for swinging away from the supporting base.

Special objects of the present invention are to provide a clutch which can be freely engaged and which as power is applied, will operate automatically to draw the companion shaft elements together into fully clutched relation and hold them so, as long as power is applied, without special latches or other external equipment.

Another and related object is to provide a clutch construction which while holding the shafts fully coupled while the power is on, will automatically and immediately release the holding clutch elements to permit instant separation of the shafts, without having to unfasten spring latches or other holding devices.

Further special objects of the invention are to provide an automatic holding and releasing clutch of the character indicated which will be of simple, strong and inexpensive construction, easy to manufacture and which at the separable shaft end will be of no greater external diameter than the shaft itself so that it may pass through bearings, bushings and the like of no greater than shaft size.

Other desirable objects and the novel features through which the purposes of the invention are attained are set forth or will appear in the course of the following specification.

The drawing accompanying and forming part of the specification illustrates certain present commercial embodiments of the invention but structure may be modified and changed as regards such illustration, all within the true intent and broad scope of the invention as hereinafter defined and claimed.

Fig. 1 in the drawing is a front elevation and part sectional view of a power unit of the type disclosed in the patents above identified and having the present invention incorporated therein;

Fig. 2 is a broken plan view of the same with parts appearing in horizontal section as on substantially the plane of line 2—2 of Fig. 1;

Fig. 3 is an enlarged broken sectional detail illustrating engagement and interlocking of the clutch parts appearing in Fig. 2;

Fig. 4 is a cross sectional view showing the engaged clutch elements as on substantially the plane of line 4—4 of Fig. 3;

Fig. 5 is a similar view illustrating a modification in the form of the clutch elements;

Fig. 6 is a broken sectional detail illustrating a further modification of the invention.

The power unit shown in Figs. 1 and 2 is of the type disclosed in the Robert Hoe Patents 1,864,304 and 1,983,292, mentioned above, and involving upper and lower motor driven power shafts 7 and 8 operating in a base or casing structure 9 and designed for driving various appliances carried by supporting brackets such as represented at 10, arranged for detachable engagement over the hinge pins 11, 12, 13, on the front of the casing.

The swinging support 10 carries the shaft 14 of the driven appliance or attachment, the parts being so designed that in its swinging movement the support will carry this shaft into and out of axially aligned relation with one or the other of the driving shafts 7 or 8, depending upon which hinge pins the bracket is mounted on.

Companion longitudinally engageable and rotary interlocking clutch elements are provided on the adjoining ends of the driving and driven shafts by reducing the end portions of the shafts to generally semicylindrical form and by tapering such portions inwardly from the ends of the shafts to form undercut companion clutch jaws.

The projecting, generally semicylindrical clutch jaw of the drive shaft is designated 15 and the companion, substantially similar projecting jaw of the driven shaft is designated 16, these having inclined, undercut, opposed clutch faces 17, 18, engaging under rotative movement of the drive shaft to effect the drawing of the movable, driven shaft toward and inwardly into the full grasp of the driving shaft.

This relative endwise movement under impulse of the driving shaft is limited, in the illustration, by engagement of the swinging supporting bracket 10 with the fixed bearing rim or projecting flange 19 on the face of the motor stand or casing of the machine, as indicated in Figs. 2 and 3.

To facilitate easy endwise engagement of the clutch projections, one over the other, they may be of slightly less than full semicylindrical form at their ends, as indicated in Fig. 2. Then in case of full abutment in the act of closing the clutch, a slight turn of either the motor operated or the driven shaft will be sufficient to enable the projecting jaw of the driven shaft to slip inwardly over the companion jaw of the drive shaft.

The drive shaft is shown as having a sleeve or collar 20 pinned thereon at 21, said sleeve surrounding the clutch portion of the shaft and providing a substantially semicylindrical socket 22 at the side of the drive tang 15 to receive and form a guard about the companion clutch portion 16 of the driven shaft.

For purposes of illustration, the driven shaft has been shown as of slightly less diameter than the drive shaft, but it will be appreciated that it may be of the same or substantially the same diameter, and in which case the end of the driven shaft would fit more closely in the socket of the driving clutch element than shown in Figs. 2 and 3. The guard sleeve providing this socket may extend beyond the end of the driving clutch member, as shown in Figs. 2 and 3, so as to enclose both the projecting clutch element and the full diameter portion of the driven shaft or, as shown in Fig. 6, the guard sleeve 20 may terminate at the end of the driving clutch element 15, thus to form a socket only for the projecting clutch portion 16 of the driven shaft.

Fig. 4 shows how the oppositely inclined undercut faces of the clutch elements will engage along one edge of said elements to effect the drive coupling and pull connection between the shafts, and this more or less of a line engagement is sufficient for general purposes. However, if more of a surface engagement is found desirable, the corner edge of one of the clutch elements may be cut away on an incline as indicated at 23 in Fig. 5, substantially parallel with the opposing engaging face of the other clutch element.

The single clutch jaw of each shaft end being substantially half the shaft section, is amply strong to carry all ordinary shaft loads. These clutch elements can be produced at low cost by simple milling or equivalent operations.

The elimination of need for fastening means to hold the movably supported shaft in clutched engagement with the driving shaft reduces cost by saving the expense of latch mechanism and special design of the support to cooperate with such mechanism. This also leaves the face of the drive base smooth and clear of latch mechanism or equivalent and the swinging support for the shaft can be designed without projecting parts to cooperate with such mechanism.

Possibly the main advantages, however, are in the use or operation of the power unit. After placing the attachment support 10 on the hinge pins it is only necessary to swing it in toward the face of the unit sufficiently to enter the undercut projection 16 of the driven shaft into the half socket 22, for in such relation the shafts will be clutched together into the fully overlapped clutched engagement shown in Fig. 3, as soon as power is applied to the driving shaft. And the parts will be held together in this fully clutched engagement, with the bracket 10 held up against the stop 19, so long as the power is on. At any time, however, the parts can be quickly released by simply turning off the power or otherwise stopping operation of the drive shaft which, without the oversliding coupling component of the oppositely inclined clutch faces 17, 18, releases longitudinal pull on the driven shaft, permitting the support, without any unlatching or other action, to be swung outwardly away from the drive shaft. This is so even if the parts stop with the inclined clutch faces in the fully engaged relation shown in Figs. 4 and 5, for in such case the longitudinal pull applied on the driven shaft will, through the reverse wedging action, effect the turning of the shafts relatively to a position like that shown in Figs. 2 and 6, where they are fully free to be separated one from the other.

While ordinarily the parts may be arranged as shown, that is, with the socketed clutch element on the driving shaft, it is possible that they may be reversed, with the socket structure on the driven shaft. In either case there is the advantage that one clutch member is of no greater than shaft diameter and so can pass through a guide, bearing or other necessary structure in which it may be convenient or desirable to have an opening no larger than shaft diameter.

What is claimed is:

1. In combination, a power unit having a driving shaft and a driven device support movable toward and away from said unit and having an axially aligning driven shaft for endwise coupling engagement with and separation from said driving shaft, said shafts having generally semicylindrical end portions of less than full semicylindrical dimensions so as to readily engage one over the other in axially aligned relation, said engaging portions tapering inwardly from the ends thereof in undercut inclined shoulders which will interlock endwise on relative rotation of the two shafts to enable the driving shaft to automatically draw the driven shaft longitudinally toward it and thereby to hold the support toward the power unit so long as the driving shaft is running.

2. In combination, a power unit having a driving shaft and a driven device support movable toward and away from said unit and having an axially aligning driven shaft for endwise coupling engagement with and separation from said driving shaft, said shafts having generally semicylindrical end portions of less than full semicylindrical dimensions so as to readily engage one over the other in axially aligned relation, said engaging portions tapering inwardly from the ends thereof in undercut inclined shoulders which will interlock endwise on relative rotation of the two shafts to enable the driving shaft to automatically draw the driven shaft longitudinally toward it and thereby to hold the support toward the power unit so long as the driving shaft is running, said power unit including a base on which said driving shaft is mounted, said base and movable support having parts abutting in the fully engaged position of the two shafts to thereby accurately position said shafts in axially aligned relation and said undercut interlocking engagement between the shaft ends constituting the sole means for holding said support so engaged with the base and whereby said support will be released and free to be immediately separated from the base upon discontinuing application of power to said driving shaft of the power unit.

EDWARD L. HOE.

REFERENCES CITED

The following references are of record in the file of this patent:

UNITED STATES PATENTS

| Number | Name | Date |
|---|---|---|
| 107,978 | Taft | Oct. 4, 1870 |